(12) United States Patent
Bertheville et al.

(10) Patent No.: US 12,344,559 B2
(45) Date of Patent: Jul. 1, 2025

(54) DECORATIVE CERAMIC ITEM

(71) Applicant: The Swatch Group Research and Development Ltd, Marin (CH)

(72) Inventors: Bernard Bertheville, Sion (CH); Yann Fallet, Savagnier (CH)

(73) Assignee: The Swatch Group Research and Development Ltd, Marin (CH)

( * ) Notice: Subject to any disclaimer, the term of this patent is extended or adjusted under 35 U.S.C. 154(b) by 961 days.

(21) Appl. No.: 17/298,860

(22) PCT Filed: Nov. 11, 2019

(86) PCT No.: PCT/EP2019/080898
§ 371 (c)(1),
(2) Date: Jun. 1, 2021

(87) PCT Pub. No.: WO2020/114725
PCT Pub. Date: Jun. 11, 2020

(65) Prior Publication Data
US 2022/0033312 A1 Feb. 3, 2022

(30) Foreign Application Priority Data

Dec. 7, 2018 (EP) .................................... 18211003

(51) Int. Cl.
*C04B 35/56* (2006.01)
*G04B 45/00* (2006.01)
*C04B 35/64* (2006.01)

(52) U.S. Cl.
CPC ...... *C04B 35/5607* (2013.01); *G04B 45/0076* (2013.01); *C04B 35/64* (2013.01);
(Continued)

(58) Field of Classification Search
CPC ................ C04B 35/5607; C04B 35/64; C04B 2235/3217; C04B 2235/3241; C04B 2235/3246; C04B 2235/3843; C04B 2235/3847; C04B 2235/80; C04B 2235/9661; G04B 45/0076
See application file for complete search history.

(56) References Cited

U.S. PATENT DOCUMENTS 4,087,894 A 5/1978 Kuechli et al.

FOREIGN PATENT DOCUMENTS

EP 2 266 934 A1 12/2010
FR 2072265 A5 * 11/1970
(Continued)

OTHER PUBLICATIONS

FR2072265A5 machine translation (Year: 1970).*
(Continued)

*Primary Examiner* — Bryan D. Ripa
*Assistant Examiner* — Cameron K Miller
(74) *Attorney, Agent, or Firm* — Oblon, McClelland, Maier & Neustadt, L.L.P.

(57) ABSTRACT

A decorative item is made of a ceramic material, where ceramic material includes a carbide phase and an oxide phase, the carbide phase being present in a percentage by volume comprised between 50 and 95% and the oxide phase being present in a percentage by volume comprised between 5 and 50%. The decorative item is manufactured by a method of powder metallurgy.

20 Claims, 1 Drawing Sheet

(52) U.S. Cl.
CPC .............. *C04B 2235/3217* (2013.01); *C04B 2235/3241* (2013.01); *C04B 2235/3246* (2013.01); *C04B 2235/3843* (2013.01); *C04B 2235/3847* (2013.01); *C04B 2235/80* (2013.01); *C04B 2235/9661* (2013.01)

(56) References Cited

FOREIGN PATENT DOCUMENTS

| | | |
|---|---|---|
| FR | 2 072 265 | 9/1971 |
| FR | 2 334 136 A1 | 7/1977 |
| JP | 62-153159 A | 7/1987 |
| JP | 7-82048 A | 3/1995 |

OTHER PUBLICATIONS

Wikipedia article—Chromium (Year: 2024).*
Rockwell to Vickers Hardness Conversion Chart (Year: 2024).*
International Search Report issued on Jan. 20, 2020 in PCT/EP2019/080898 filed on Nov. 11, 2019, citing documents AA and AO-AS, 2 pages.
International Preliminary Report on Patentability and Written Opinion issued Jun. 8, 2021 in PCT/EP2019/080898 (submitting English translation only), 8 pages.

* cited by examiner

DECORATIVE CERAMIC ITEM

CROSS-REFERENCE TO RELATED APPLICATIONS

The present application is the national stage of international application PCT/EP2019/080898, filed on Nov. 11, 2019, and claims the benefit of the filing date of European Appl. No. 18211003.1, filed on Dec. 7, 2018.

TECHNICAL FIELD

The present invention relates to a decorative item and in particular to a timepiece external component, made of a ceramic composite material. It also relates to its manufacturing method.

PRIOR ART

Many external components are made of composite ceramic materials which have the advantage, among others, of having very high hardnesses which guarantee their ability not to be scratched. The literature mainly reports on composites consisting in a major proportion of an oxide such as alumina to which carbides are added. They can, for example, be composites comprising by weight 70% $Al_2O_3$ and 30% TiC used as reinforcement. These composites have the feature of having little or no metallic lustre compared to other materials such as stainless steels or cermets, which can be a disadvantage for decorative items where this lustre is desired.

SUMMARY OF THE INVENTION

The object of the present invention is thus to overcome the aforementioned disadvantage by proposing a ceramic material with a composition adapted for having this metallic lustre.

To this end, the present invention provides a decorative item made from a ceramic comprising a carbide phase in a major proportion and an oxide phase in a minor proportion. More specifically, the present invention provides a decorative item made of a ceramic material comprising by volume a carbide phase in a percentage comprised between 50 and 95%, preferably between 51 and 85%, and an oxide phase in a percentage comprised between 5 and 50%, preferably between 15 and 49%.

Preferably, the carbide phase includes one or more carbides selected from TiC, $Mo_2C$ and NbC and the oxide phase includes one or more oxides selected from $Al_2O_3$, $ZrO_2$, $Cr_2O_3$ and $Y_2O_3$.

More preferably, the carbide phase includes TiC or $Mo_2C$ in a major proportion and the oxide phase includes $Al_2O_3$ in a major proportion, preferably in alpha phase in a major proportion or a mixture of alpha phase and gamma phase, or $ZrO_2$; the latter is preferably a stabilised zirconia, for example with $Y_2O_3$. According to one variant, the oxide phase including aluminium oxide in a major proportion also includes chromium oxide in a minor proportion.

According to a preferred embodiment of the invention, the decorative item comprises a carbide phase including titanium carbide in a major proportion and said carbide phase including titanium carbide in a major proportion is present in a percentage by volume comprised between 55 and 90%, preferably between 60 and 85%, the oxide phase being present in a percentage by volume comprised between 10 and 45%, preferably between 15 and 40%. According to a variant of this embodiment, said carbide phase may include niobium carbide in a minor proportion.

According to another embodiment of the decorative item of the invention, the decorative item comprises a carbide phase including molybdenum carbide in a major proportion and said carbide phase including molybdenum carbide in a major proportion is present in a percentage by volume comprised between 50 and 75%, preferably between 51 and 75%, the oxide phase being present in a percentage by volume comprised between 25 and 50%, preferably between 25 and 49%.

According to yet another embodiment of the decorative item of the invention, said carbide phase consists of titanium carbide and said oxide phase consists of aluminium oxide, said carbide phase being present in a percentage by volume comprised between 65 and 85, preferably between 70 and 80%, and said oxide phase being present in a percentage by volume comprised between 15 and 35%, preferably between 20 and 30%.

According to yet another embodiment of the decorative item of the invention, said carbide phase consists of titanium carbide and said oxide phase consists of aluminium oxide in a major proportion and of chromium oxide in a minor proportion, said carbide phase being present in a percentage by volume comprised between 55 and 75%, preferably between 60 and 70%, and said oxide phase being present in a percentage by volume comprised between 25 and 45%, preferably between 30 and 40%

The composite material thus developed has, after polishing, a metallic lustre similar to that observed in stainless steels or cermets using nickel or cobalt as metallic binder. These composites have other advantages of being free from allergenic elements such as Ni, being corrosion resistant and not being magnetic. They also have high hardnesses and sufficient toughnesses for the production of external elements. Furthermore, they can be shaped by conventional powder metallurgy methods such as pressing or injection in order to obtain "near-net shape" parts.

Other features and advantages of the present invention will become apparent from the following description of a preferred embodiment, presented by way of non-limiting example with reference to the appended drawings.

DETAILED DESCRIPTION

Figure 1:
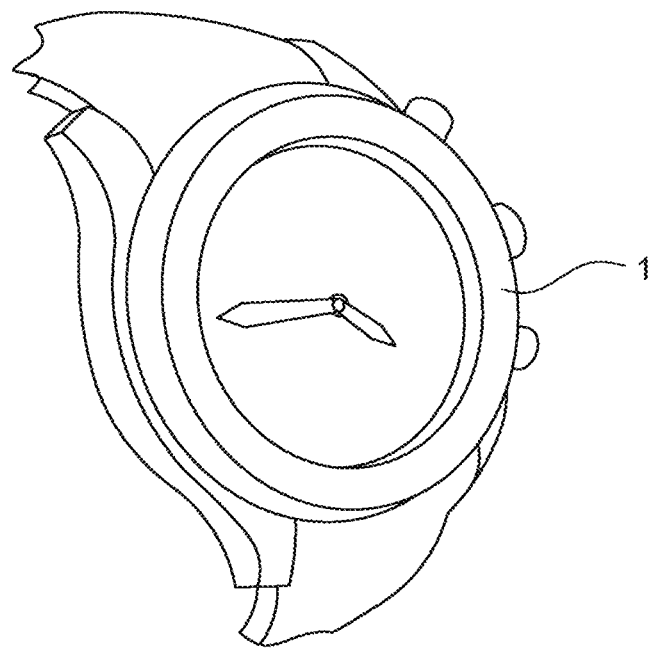
FIG. 1 shows a timepiece comprising a middle produced with the ceramic material according to the invention.

The present invention relates to a decorative item made of a ceramic composite material. The decorative item can be a component of watches, jewellery, bracelets, etc. or more generally an external portion of a portable element such as a mobile phone. In the watchmaking field, this item can be an external part such as a middle, a back, a bezel, a push-button, a bracelet link, a dial, a hand, a dial index, etc. By way of illustration, a middle 1 made with the ceramic material according to the invention is shown in FIG. 1.

The ceramic material includes a carbide-type phase constituting the matrix and an oxide-type phase distributed within the matrix. The carbide phase is present in the ceramic material in a percentage by volume comprised between 50 and 95% and the complementary oxide phase is present in a percentage by volume comprised between 5 and 50%. Preferably, the carbide phase is present in the ceramic material in a percentage by volume comprised between 51 and 85% and the complementary oxide phase is present in a percentage by volume comprised between 15 and 49%. The carbide phase includes one or more types of carbides. By way of example, it may be one or more carbides selected from TiC, $Mo_2C$, NbC, WC, etc. Preferably, the carbide phase includes one or more carbides selected from TiC, $Mo_2C$ and NbC. More preferably, the carbide phase includes TiC or $Mo_2C$ in a major proportion. The oxide phase may include one or more oxides selected, for example, from $Al_2O_3$, $ZrO_2$, $Cr_2O_3$, $Y_2O_3$, etc. Preferably, the oxide phase includes one or more oxides selected from $Al_2O_3$, $ZrO_2$ and $Cr_2O_3$. More preferably, the oxide phase includes $Al_2O_3$ or $ZrO_2$ in a major proportion.

The ceramic item is made by sintering from a mixture of the powders of carbides and oxides. The present invention therefore does not relate to a composite material with a ceramic matrix reinforced with a directional load such as ceramic fibres. The manufacturing method includes the steps of:
 a) Mixing with the various ceramic powders, possibly in a humid environment. The starting powders preferably have an d50 of less than 45 µm. The mixing can optionally be carried out in a mill or ball-mill, which reduces the d50 of the particles of the powder to a size of the order of a few microns (<5 µm) after grinding. This mixture includes by volume between 50 and 95% of a carbide powder and between 5 and 50% of an oxide powder, each powder respectively including one or more carbides and one or more oxides as indicated above. Preferably, the carbide powder includes titanium carbide (TiC) or molybdenum carbide ($Mo_2C$) in a major proportion. It can, except for impurities, consist entirely of TiC or $Mo_2C$. Alternatively, it can include TiC or $Mo_2C$ and other carbides such as NbC and WC; the latter being present in a minor proportion in the carbide powder when the powders are mixed in a mill using WC balls with a cobalt binder. The purpose of adding additional carbides is to modify the parameters of the method, such as the sintering temperature and/or to modify the properties obtained. Preferably, the oxide powder includes aluminium oxide ($Al_2O_3$) or zirconium oxide ($ZrO_2$) in a major proportion. It can, except for impurities, consist entirely of $Al_2O_3$ or $ZrO_2$. Alternatively, it may include $Al_2O_3$ or $ZrO_2$ and another oxide such as $Cr_2O_3$, the latter being present in a minor proportion in the oxide powder and having the object of modifying the properties obtained. By way of example, the mixture of powders can include by volume one of the following distributions for a total of 100%:
 between 65 and 85% of TiC and between 15 and 35% of $Al_2O_3$,
 between 60 and 80% of TiC, between 2 and 10% of NbC and between 15 and 35% of $Al_2O_3$,
 between 55 and 75% of TiC, between 2 and 10% of $Cr_2O_3$ and between 20 and 40% of $Al_2O_3$,
 between 70 and 90% of TiC and between 10 and 30% of $ZrO_2$, between 60 and 80% of $Mo_2C$ and between 20 and 40% of $Al_2O_3$,
 between 50 and 60%, preferably between 51 and 60%, of $Mo_2C$ and between 40 and 50%, preferably between 40 and 59%, of $Al_2O_3$,
 between 65 and 85% of TiC, between 1 and 5% of $Cr_2O_3$ and between 10 and 30% of $Al_2O_3$.
 b) Optionally, a second mixture comprising the above mixture and an organic binder system (paraffin, polyethylene, etc.) can be produced.
 a) Forming a blank by giving the mixture the shape of the desired item, for example, by injection or pressing.
 c) Sintering the blank under an inert atmosphere at a temperature comprised between 1300 and 2100° C. for a period comprised between 15 minutes and 20 hours. This step can be preceded by a step of dewaxing the organic binders in a temperature range comprised between 200 and 800° C. if the mixture includes a binder system.

The blank thus obtained is cooled and polished. It can also be machined before sintering and/or before polishing to obtain the desired item.

The item resulting from the manufacturing method includes the phase comprising the carbides and the phase including the oxides in volume percentages close to those of the starting powders. Indeed, a priori, the carbide and oxide phases coexist without the formation of new phases during sintering. However, small variations in composition and in percentages between the base powders and the material resulting from sintering cannot be ruled out, for example following contamination.

The item has a CIELAB colour space (complies with the standards CIE n° 15, ISO 7724/1, DIN 5033 Teil 7, ASTM E-1164) with a luminance component L*, representative of how the material reflects light, comprised between 60 and 85 and, preferably, between 65 and 80. The components a* (red component) and b* (yellow component) can be modulated as desired depending on the choice of oxides. Advantageously, the components a* and b* are respectively comprised between −1 and 5 and between −2 and 5. Preferably, the component a* is comprised between −0.5 and 2 and the component b* is comprised between −0.5 and 3. A ceramic material with a white metallic appearance may be preferred. In this case, the components a* and b* are equal to 0.

The ceramic material has a hardness HV30 comprised between 1200 and 1950 depending on the types and percentages of the constituents. It has a toughness $K_{ic}$ comprised between 2 and 8.5 MPa·m$^{1/2}$, the toughness being determined on the basis of measurements of the lengths of the cracks at the four ends of the diagonals of the hardness indentation according to the formula:

$$K_{1C} = 0.0319 \frac{P}{al^{1/2}}$$

with P which is the applied load (N), a which is the half-diagonal (m) and/which is the length of the measured crack (m).

In particular, the ceramic material comprising a carbide phase consisting of TiC and an oxide phase consisting of $Al_2O_3$, except for impurities, has a very good toughness-hardness compromise. Thus, when this carbide phase is present in a percentage by volume comprised between 65 and 85, preferably between 70 and 80%, with the complementary phase of $Al_2O_3$, the values $HV_{30}$ are greater than or equal to 1800, or even to 1900, and the values KiC are greater than or equal to 3.5 MPa·m$^{1/2}$.

Likewise, the ceramic material comprising a carbide phase consisting of TiC and an oxide phase consisting of $Al_2O_3$ and $Cr_2O_3$, except for impurities, has a very good toughness-hardness compromise. Thus, when this carbide phase is present in a percentage by volume comprised between 55 and 75%, preferably between 60 and 70%, with the complementary phase of $Al_2O_3$ and $Cr_2O_3$, the values $HV_{30}$ are greater than or equal to 1800 and the values KiC are greater than or equal to 4.5, or even to 5 MPa·m$^{1/2}$.

The examples below illustrate the method according to the invention and the material resulting therefrom.

EXAMPLES

Seven powder mixtures were prepared in a mill in the presence of a solvent. The mixtures were made without a binder. They were shaped by pressing and sintered under a flow of argon at 60 mbar at a temperature which depends on the composition of the powders. After sintering, the samples were coated and plane polished.

Hardness measurements $HV_{30}$ were carried out on the surface of the samples and the toughness was determined on the basis of the hardness measurements as described previously.

Lab colourimetric values were measured on polished samples with a spectrophotometer KONICA MINOLTA CM-5 under the following conditions: SCI (specular reflection included) and SCE (specular reflection excluded) measurements, tilt of 8°, measurement area MAV of 8 mm in diameter.

Example 1 (80% TiC and 20% $Al_2O_3$ by Weight)

The mixture of powders includes 80% TiC and 20% $Al_2O_3$ (in alpha phase) by weight, that is to say 76% and 24% by volume, respectively. The blank was sintered at 2000° C. for 20 minutes. The sample has an average hardness of 1932 $HV_{30}$ and a toughness of 4 MPa·m$^{1/2}$. The Lab components are respectively equal to 66.3, 0.44 and 0.73.

Example 2 (70% TiC, 10% NbC and 20% $Al_2O_3$ by Weight)

The mixture of powders includes 70% TiC, 10% NbC and 20% $Al_2O_3$ (in alpha phase) by weight, that is to say 69%, 6% and 25% by volume, respectively. The blank was sintered at 1800° C. for 30 minutes. The sample has an average hardness of 1255 $HV_{30}$ and a toughness of 3.8 MPa·m$^{1/2}$. The Lab components are respectively equal to 63.3, 0.00 and 0.09. Adding NbC allows to lower the sintering temperature by 200° C. but has the effect of reducing hardness.

Example 3 (70% TiC, 25% $Al_2O_3$ and 5% $Cr_7O_3$ by Weight)

Figure 2:
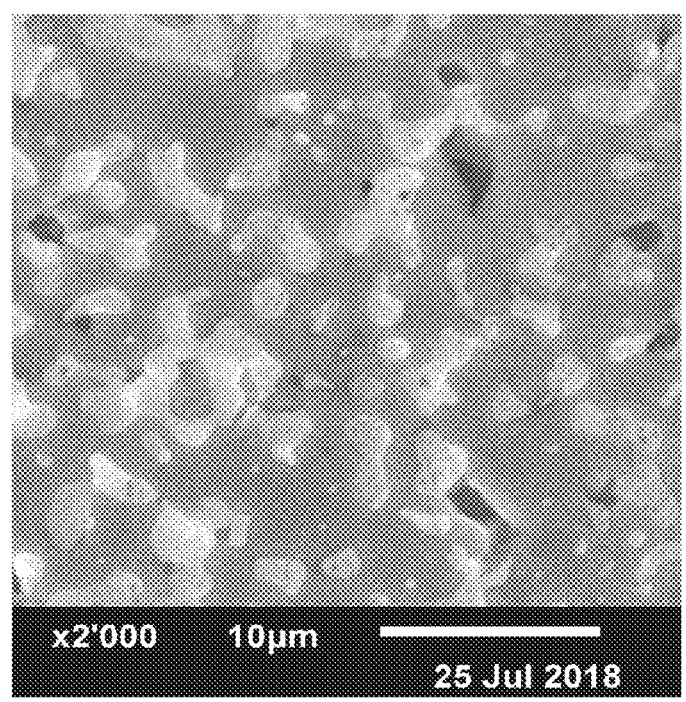
FIG. 2 shows an electron microscopy image of the ceramic material according to the invention.

The mixture of powders includes 70% TiC, 25% $Al_2O_3$ (in alpha phase) and 5% $Cr_2O_3$ by weight, that is to say 66%, 29.5% and 4.5% by volume, respectively. The blank was sintered at 1750° C. for 90 minutes. The sample has an average hardness of 1830 $HV_{30}$ and a toughness of 5.2 Mpa·m$^{1/2}$. The Lab components are respectively equal to 64.5, 0.34 and 0.92. Adding 5% $Cr_2O_3$ allows to obtain high hardness and to increase toughness. An electron microscopy image of this sample is shown in FIG. 2, the grey phase represents the TiC matrix and the white phase represents the oxide phase.

Example 4 (80% TiC and 20% $ZrO_2$ by Weight)

The mixture of powders includes 80% TiC and 20% $ZrO_2$ by weight (stabilised zirconia containing 3 mol % of $Y_2O_3$), that is to say 82% and 18% by volume, respectively. The blank was sintered at 1750° C. for 90 minutes. The sample has an average hardness of 1617 $HV_{30}$ and a toughness of 2.5 mpa·m$^{1/2}$. The Lab components are respectively equal to 66.5, −0.39 and −1.14. Replacing aluminium oxide with zirconia allows to reduce the components a* and b* but also has the effect of reducing toughness.

Example 5 (85% $Mo_2C$ and 15% $Al_2O_3$ by Weight)

The mixture of powders includes 85% $Mo_2C$ and 15% $Al_2O_3$ (in alpha phase) by weight, that is to say 72% and 28% by volume, respectively. The blank was sintered at 1450° C. for 90 minutes. The sample has an average hardness of 1319 $HV_{30}$ and a toughness of 5.3 MPa·m$^{1/2}$. The Lab components are respectively equal to 72.5, 0.21 and 2. Replacing titanium carbide by molybdenum carbide allows to greatly reduce the sintering temperature while increasing the value of the luminance index L*.

Example 6 (70% $Mo_2C$ and 30% $Al_2O_3$ by Weight)

The mixture of powders includes 70% $Mo_2C$ and 30% $Al_2O_3$ (in alpha phase) by weight, that is to say 51% and 49% by volume, respectively. The blank was sintered at 1450° C. for 90 minutes. The sample has an average hardness of 1417 $HV_{30}$ and a toughness of 5.0 MPa·m$^{1/2}$. The Lab components are respectively equal to 63.8, 0.13 and 1.49. Increasing the proportion of aluminium oxide allows to increase the hardness but leads to a decrease in the luminance index L*.

Example 7 (80% TiC, 18% $Al_2O_3$ and 2% $Cr_2O_3$ by Weight)

The mixture of powders includes 80% TiC, 18% $Al_2O_3$ (in alpha phase) and 2% $Cr_2O_3$ by weight, that is to say by volume respectively 76.5%, 21.5 and 2%. The blank was sintered at 1650° C. for 90 minutes. The sample has an average hardness of 1219 $HV_{30}$ and a toughness of 7.8 mpa·m$^{1/2}$. The Lab components are respectively equal to 65, 0.06 and 0.4. Adding a small amount of chromium oxide allows to improve toughness.

In summary, it is observed that samples 1 and 3 have a very good toughness-hardness compromise with hardness and toughness values higher than 1800 $HV_{30}$ and 3.5 MPa·m$^{1/2}$ respectively and that sample 7 has a very good toughness with a value greater than 7 MPa·m$^{1/2}$.

The invention claimed is:

1. A decorative item, comprising:
   a ceramic material comprising (i) $Mo_2C$ in range of from 70 to 85 vol. %
   and (ii) $Al_2O_3$ in a range of from 15 to 30 vol. %,
   wherein the item has a hardness $HV_{30}$ in a range of from greater than 1319 to 1800 and a toughness $K_{iC}$ in a range of from 3.5 to 8.5 MPa·m$^{1/2}$.

2. The item of claim 1, wherein the ceramic material further comprises niobium carbide in a minor proportion.

3. The item of claim 1, wherein the $Mo_2C$ is present in a range of from 70 to 75 vol. %, and
   wherein the $Al_2O_3$ is present in a range of from 25 to 30 vol. %.

4. The item of claim 1, further comprising:
   chromium oxide in a minor proportion.

5. The item of claim 1, having, in a CIELAB color space, a luminance component L* in a range of from 60 to 85.

6. The item of claim 5, having a red component a* in a range of from −1 to 5, and a yellow component b* in a range of from −2 to 5.

7. The item of claim 6, wherein the components a* and b* are 0.

8. The item of claim 1, which is a timepiece external component which is a middle, a back, a bezel, a push-button, a bracelet link, a dial, a hand, or a dial index.

9. The item of claim 1, wherein the carbide phase comprises tungsten carbide in minor proportion.

10. The item of claim 1, wherein the ceramic material consists of $Mo_2C$, $Al_2O_3$, and inevitable impurities.

11. The item of claim 1, having a hardness $HV_{30}$ in a range of from 1319 to 1417.

12. The item of claim 1, having a toughness $K_{IC}$ in a range of from 5.0 to 5.3 $MPa \cdot m^{1/2}$.

13. The item of claim 1, having, in a CIELAB color space, a luminance component L* in a range of from 63.8 to 72.5.

14. The item of claim 1, having a red component a* in a range of from 0.13 to 0.23, and a yellow component b* in a range of from 1.49 to 2.

15. The item of claim 1, having, in a CIELAB color space,
a luminance component L* in a range of from 63.8 to 72.5,
a red component a* in a range of from 0.13 to 0.23, and
a yellow component b* in a range of from 1.49 to 2.

16. A decorative item, comprising:
a ceramic material comprising (i) $Mo_2C$ in range of from 51 to 72 vol. %
and (ii) $Al_2O_3$ in a range of from 28 to 49 vol. %
wherein the item has a hardness $HV_{30}$ in a range of from 1319 to 1800 and a toughness $K_{IC}$ in a range of from 3.5 to 8.5 $MPa \cdot m^{1/2}$.

17. The item of claim 16, having, in a CIELAB color space,
a luminance component L* in a range of from 63.8 to 72.5,
a red component a* in a range of from 0.13 to 0.23, and
a yellow component b* in a range of from 1.49 to 2.

18. The item of claim 1, having a hardness $HV_{30}$ in a range of from 1319 to 1417, and
having a toughness $K_{IC}$ in a range of from 5.0 to 5.3 $MPa \cdot m^{1/2}$.

19. The item of claim 18, wherein the $Mo_2C$ is present in a range of from 70 to 75 vol. %, and
wherein the $Al_2O_3$ is present in a range of from 25 to 30 vol. %.

20. The item of claim 17, wherein the $Mo_2C$ is present in a range of from 50 to 60 vol. %, and
wherein the $Al_2O_3$ is present in a range of from 40 to 50 vol. %.

* * * * *